Figure 1:
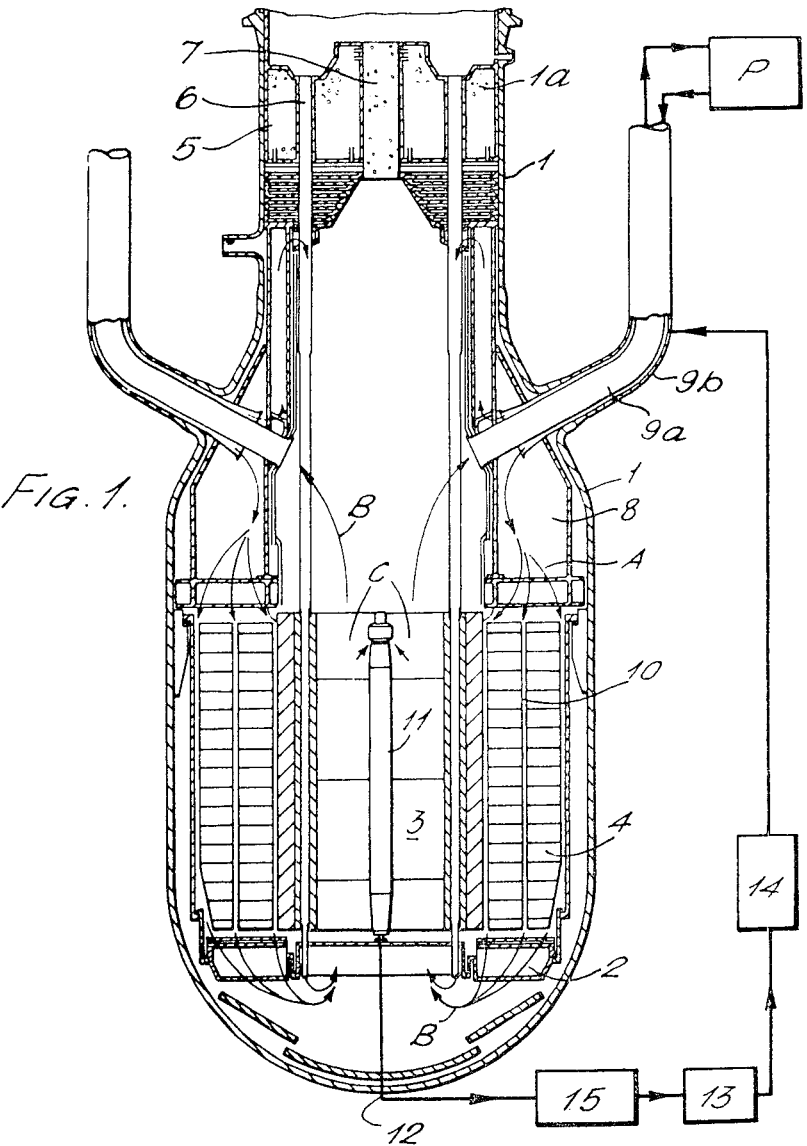

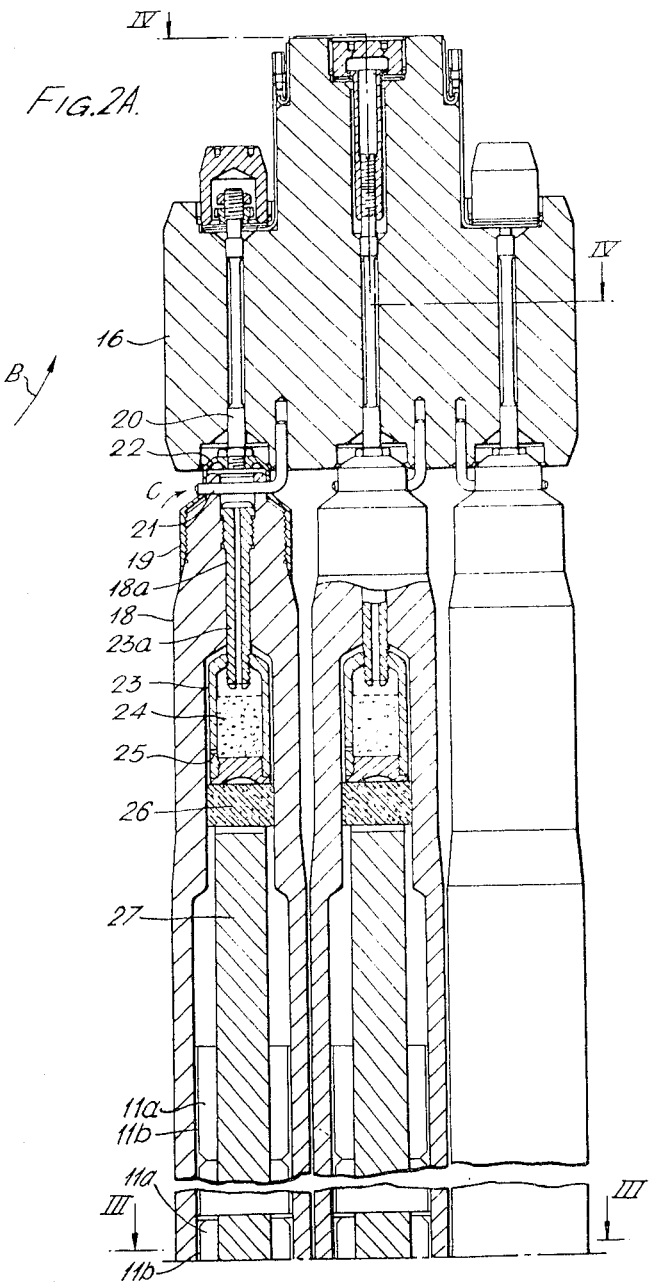

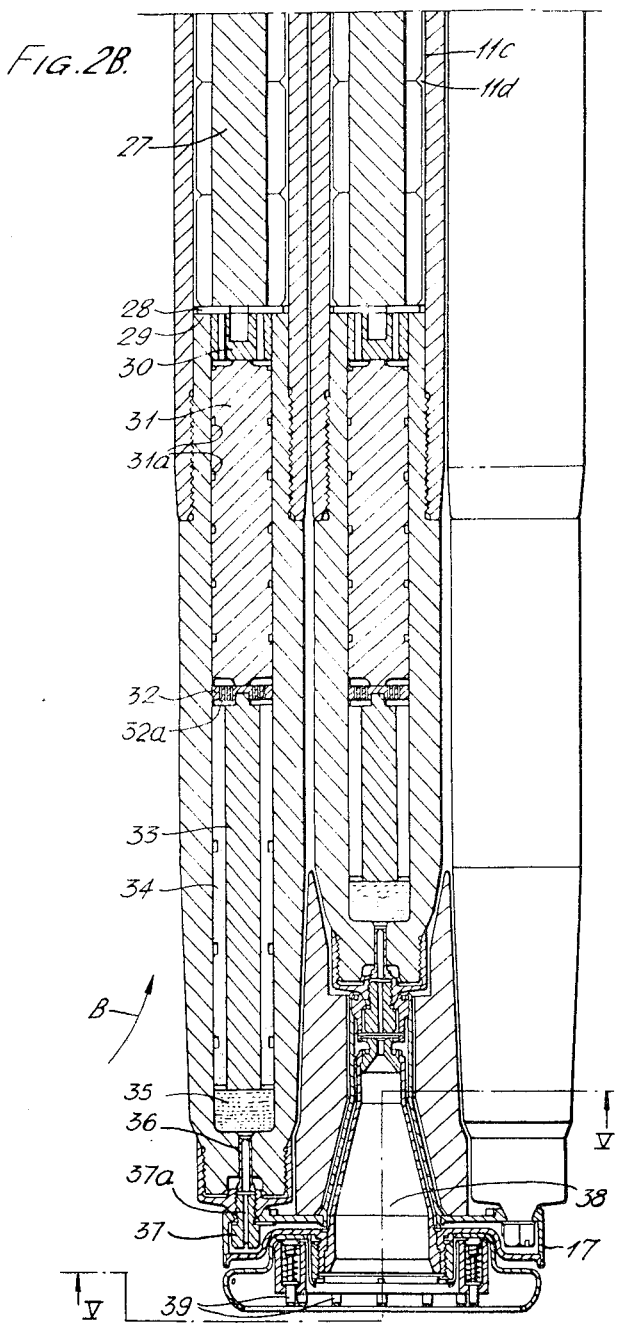

United States Patent Office 3,275,522
Patented Sept. 27, 1966

3,275,522
HIGH TEMPERATURE GAS COOLED REACTORS WITH INTERNAL FISSION BY-PRODUCT TRAPPING MEANS
Denis Victor Kinsey, Weymouth, Dorset, and Leon Jean Valette, Poole, Dorset, England, and Johan Lothe, Oslo, Norway, assignors to United Kingdom Atomic Energy Authority, London, England
Filed Mar. 26, 1963, Ser. No. 268,038
Claims priority, application Great Britain, Mar. 28, 1962, 11,842/62
5 Claims. (Cl. 176—37)

This invention relates to high temperature gas cooled reactors and aims to reduce the possibility of deleterious corrosion reactions between the gas coolant and those parts of the reactor core subjected to high temperatures.

In such reactors it is usual to pass a gas along a flowpath in close proximity with the nuclear fuel elements to extract heat therefrom, the flowpath leading the heated gas through a heat exchanger or other heat utilization plant. The fission products generated during operation of the fuel and emitted therefrom may, according to one reactor system, be prevented from reaching the coolant gas by passing within the fuel elements, a so-called purge gas stream in which the fission products are entrained as they diffuse from the fuel. The purge gas stream leaves the reactor and is passed to a purification plant.

It can be shown that with certain core materials, unless the gas has an extremely low impurity concentration, corrosion reactions will occur between these impurities and the core material resulting in damage to the core material. For example, it has been shown that in the case of helium as a coolant gas and graphite as a fuel container material, operating at 1200° C. then the $CO_2$ or water vapour impurity level of the gas would need to be as low as 0.03 v.p.m. (volumetric parts per million), if serious corrosion of graphite components were to be avoided over an operation period of from one to three years.

It is difficult to arrange for a supply of purge gas of such a low impurity concentration to be available at the high temperature part of the reactor where it, the gas, enters the purge gas flowpath.

According to the invention, in a gas cooled high temperature nuclear reactor having a channel for leading purge gas along a flowpath extending in close proximity with fuel bearing core material which, at operating temperatures, is susceptible to corrosion by reactions between said material and substances entrained in the gas, there is provided a trapping means capable of extracting said substances from the gas located in the flowpath upstream of the region in which said fuel bearing core material is located.

In one nuclear reactor to which the present invention is applicable, the fuel bearing core components may be in the form of tubes of moderating material and are adapted to enclose, loosely, nuclear fuel material. This fuel material may be in the form of nuclear fuel compacts composed of compounds of nuclear fuel metals dispersed in graphite, or may be comprised of graphite containers enclosing compacts of nuclear fuel compounds. The outer surfaces of the fuel element tubes are swept by helium or other inert gas for heat removal and transport to a heat exchanger. One end of each tube is ported to allow gaseous coolant, in this case helium, to be drawn along a flowpath bounded by the nuclear fuel bearing components and the inner face of the fuel tubes.

A quantity of helium gas may be drawn from the main coolant volume as a purge gas stream, through the ported end of each fuel tube and along this flowpath, so as to flow in close proximity with the nuclear fuel material for the purpose of removing such fission products as are formed under operational conditions and which diffuse from the fuel into the flowpath. The temperature of the inner wall of the flowpath will be about equal to fuel temperature, for example, about 1200° C. at which temperature the impurity (i.e. $CO_2$ and/or water vapour) concentration in the gas need only be of the order of 5 v.p.m. for oxidation effects to result in serious corrosion of graphite.

To reduce the possibility of this corrosion, it is presently proposed to position at a region of the purge gas flowpath upstream of fuel bearing component, a trapping means, which acts as an extractant with respect to the helium impurities, $CO_2$ and water vapour.

It can be shown that the reactivity of the trapping means in the form of a porous body of graphite can be increased by incorporating in it small quantities of the oxides of barium, strontium and nickel as catalysts, e.g. 0.05% by weight of barium oxide increases the reaction rate by a factor of about 1,000. Any other element, compound or mixture having suitable catalytic properties may be used; with the inclusion of nickel the reaction rate can be increased by a factor of $10^6$. The porous body may be in the form of a graphite compact or a mass of loose graphite grains retained by a porous container, in either case incorporating a suitable catalyst.

Alternatively, the porous reactive body may be composed of a gettering metal material. The use of titanium or zirconium; an alloy of these, or a zirconium/aluminium alloy is envisaged in this respect.

As a further alternative, a gettering metal may be used in admixture with graphite in the form of grains, or as a porous compact, activated by a catalytic agent such as barium or strontium, or compounds thereof.

Figure 3:
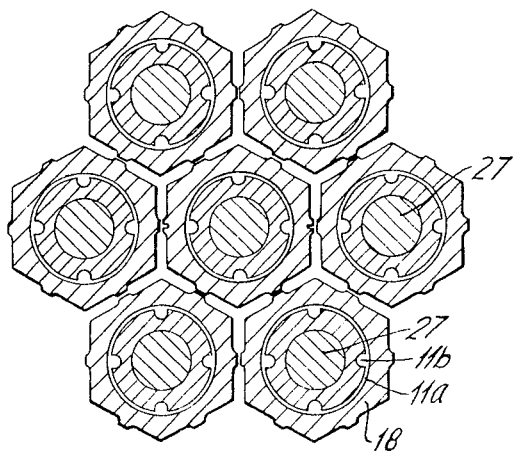
Figure 4:
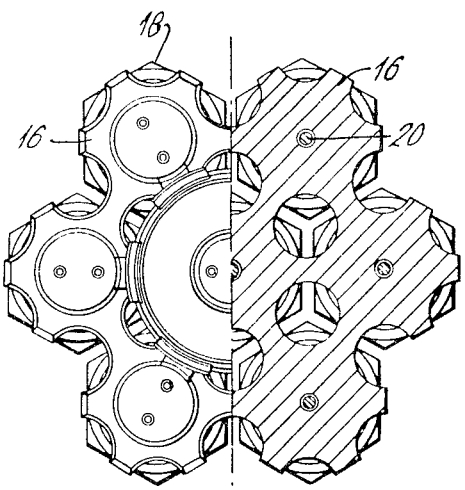
Figure 5:
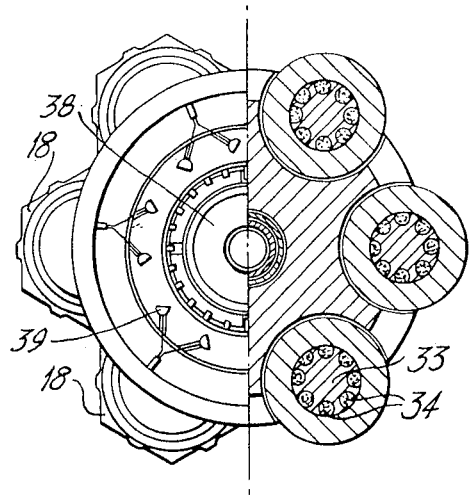

In order that the invention may be better understood one embodiment thereof as applied to a high temperature gas cooled reactor will now be described with reference to the accompanying drawings in which;

FIG. 1 is a diagram of a high temperature gas cooled reactor as seen in an axial cross section through its cylindrical pressure vessel, FIGS. 2A–B show a view of a cluster of fuel bearing components or elements, shown only in outline in FIG. 1, two of the fuel elements of the cluster being shown in axial cross section, FIG. 3 is a cross section on the lines III—III of FIG. 2A, FIG. 4 is a plan view of FIG. 2B half of which view is a cross section on the line IV—IV, FIG. 5 is an underplan of FIG. 2A one half of the underplan being a cross section on the line V—V of FIG. 2.

Referring firstly to FIG. 1, the reactor shown is generally of the kind described in the first, second and third annual reports (1960, 1961 and 1962) of the O.E.C.D. High Temperature Reactor Project (DRAGON). The parts include a right cylindrical pressure vessel 1 within which a structure 2 supports an inner cylindrical core 3 composed of clusters of fuel bearing components referred to herein as fuel elements and an annular reflector 4 composed of graphite columns. The neck 1a of the vessel 1 is closed by a plug 5 which has penetrations 6 for control mechanisms and a removable fuel charge plug 7. Helium gas is used as a coolant and this is admitted to an annular plenum chamber 8 via the outer duct 9b of inner and outer concentric ducts 9a, 9b. The coolant gas is drawn downwards through channels 10 in the reflector 4 to the base of the vessel (see arrows A) and thence upwardly through the core as indicated by arrows B. The outer surfaces of the fuel elements are thus swept by coolant gas which passes from the vessel via the inner ducts 9a to a heat utilization plant P.

In order to minimise contamination of the primary circuit a fraction of the coolant is induced to flow through the fuel elements in a flowpath separate from that of the main coolant flow so as to entrain any fission products formed during operation of the nuclear fuel and emitted therefrom. Such a flow indicated by arrow C is referred to as the purge gas since it purges the fuel elements of fission products. The purge flow leads the entrained products through the fuel element mountings in small bore tubes 12 to a sampling facility 13 and a filter 14 whence the cleaned gas is returned to the main volume of the coolant.

Some means 15 is interposed in the purge gas stream downstream of the fuel elements to allow the pressure drop across each fuel element to be individually sensed.

Although in FIG. 1 only one fuel element 11 is shown, it will be understood that the core comprises a number of such elements grouped in clusters of seven (in this example) so that a number of these elements can be handled as a single component.

As shown in FIG. 2, a typical fuel element cluster comprises an assembly of seven fuel elements 11 held at their upper ends by a graphite block 16 and at their lower ends by a fitting 17.

Each of the fuel elements 11 comprise an outer tube 18 of graphite hexagonal in outer contour and having a metal end cap 19 at its upper end. The end cap 19 supports a bolt 20 by means of which the tube is attached to the graphite block 16. A cranked locating pin 21 which is fixed to the end of the graphite tube 18 and engages a hole in the block 16 prevents rotation of the tube relative to the block.

The bore of the tube 18 near its upper end has a portion 18a of reduced diameter and communicates with the outside of the gas coolant by way of three ports only one of which is shown at 22 in the metal end cap 19, the ports forming a purge gas inlet. Within the reduced diameter portion 18a is a stem 23a whose end extends into the full diameter port of the tube bore wherein it supports a graphite canister 23 containing a mass 24 of a graphite filter material for trapping dust particles. The wall of the canister is pierced by one or more holes 25 which communicate the interior of the canister with the bore of the tube. The canister 23 with its hole or holes 25 form a pressure dropping orifice near the purge gas inlet. Beneath the canister 23 is located a trapping means 26 composed of a porous block of graphitic material, including chemically reactive graphite, made reactive by the incorporation of a barium or strontium catalyst.

Centrally within the tube bore and beneath the trapping means 26 is located a spine 27. The spine 27 is a composite member formed in short tubular lengths each long enough to support three annular nuclear fuel cartridges 11a superimposed on each other. The latter are fairly loose fitting within the bore of the tube 18 and on the central spine and have longitudinally extending grooves 11c at spaced regions of the periphery so as to provide clearance for the purge gas flow. At the ends of each fuel cartridge 11b an annular chamber 11d is formed so that the flowpath for purge gas will be contiguous whether or not the grooves 11c are in alignment.

The lowermost length of spine 27 is supported on a spider 28 which is a loose fit within the tube core. The spider 28 sits peripherally on an internal shoulder 29 which is formed by the end face of the bottom portion of the fuel tube, the spider being supported centrally by a distance piece 30.

The latter in turn seats on a filler piece 31 beneath which is a flow distribution disc 32. The filler piece 31 is cut peripherally with a helical groove 31a.

The disc 32 has two annular rows of holes 32a which form the inlets for purge to a fission product trapping compartment in the lower end of the tube mainly for trapping halogens in the fission products. The compartment is formed by a rod 33 having eight longitudinal grooves 34 in its periphery which are filled with porous material. The centre portion of the rod 33 supports the fuel tube internals above it and is seated on a bed 35 of permeable filter material.

The outlet for purge gas from the tube 18 is a bore 36 in the tube base which leads the gases to a hole 37a aligned therewith in a plug 37 in the end fitting. From the hole 37a the purge gas flows within the channels in the end fitting to pass to the small bore tube 12 (FIG. 1).

As shown, the end fitting provides a conical seating 38 for engaging a conical mounting spike projecting from the structure 2. The end fitting also carries an array of electrical contacts 39 by which electrical contacts can be made between the fuel element cluster and the structure 2.

It will be clear from the foregoing that the purge gas flow C enters the fuel element via ports 22 in each of the metal end caps 19 and passes through the stem 23a to the canister 23 wherein dust entrained in the air is trapped. The purge gas leaves the canister 23 via holes 25 and passes through the porous block 26 of reactive graphite which extracts helium impurities, $CO_2$ and water vapour likely to promote corrosion.

The purge gas passes through the annular clearances defined between the fuel cartridges and the inner face of the tube 18 entraining fission products emitted from the fuel. The purge gas leaves the fuel element at its base after traversing grooves 31a beds 34 and 35, via bore 37a.

By arranging that the fuel tube 18 is formed of a more permeable graphite over substantially the whole of its length which encloses the nuclear fuel, a continuous inward diffusion of gas, against the possible outward diffusion fission products, may be established.

In addition, it is further proposed to reduce the chemical reactivity of the graphite used for fuel compacts or fuel spine or tubes by incorporating small amounts of substances in the graphite which suppress or inhibit the catalytic activity of the fission products barium and strontium. Such a substance may be oxides of silicon, zirconium or aluminium.

As applied to the foregoing such a proposal involves the inclusion of the oxides of silicon, zirconium or aluminium in the graphite stock from which the graphite spine 27 and/or fuel tubes 18 are made.

It will be appreciated that where the porous body is located between the ported end of the fuel tube and the fuel itself, in order to preserve the correct flow conditions in the purge gas stream the pressure drop across the porous body must be much less than that through the port in the fuel tube.

We claim:
1. A graphite fuel bearing component for a high temperature gas cooled nuclear reactor having a fuel bearing region, means defining therein a channel for gaseous coolant, said channel having an inlet portion, an intermediate portion extending adjacent the fuel bearing region, and an outlet portion, said component being susceptible to corrosion by impurities in said gas stream, trapping means supported in said inlet portion, said trapping means comprising a porous body of graphite having at least one material incorporated therein to make said body reactive with respect to said impurities.

2. In a gas cooled high temperature nuclear reactor having a core containing a material which is susceptible to corrosion by reactions between said material and substances contained in the gas, a number of nuclear fuel bearing components supported in the core, means defining a flowpath for coolant gas in the core, said means defining a flowpath having an inlet portion, an intermediate portion extending in close proximity with the fuel bearing component, and an outlet portion, trapping means for extracting said substances from the gas, said trapping means comprising a porous reactive body formed at least in part of a gettering metal material selected from the group consisting of titanium, zirconium, zirconium/titanium alloy, and zirconium/aluminum alloy, and support means for supporting said trapping means in said inlet portion of said means defining a flowpath.

3. A graphite fuel bearing component for a high temperature gas cooled nuclear reactor having a fuel bearing region, means defining therein a channel for gaseous coolant, said channel having an inlet portion, an intermediate portion extending adjacent the fuel bearing region, and an outlet portion, said component being susceptible to corrosion by impurities in said gas stream, trapping means supported in said inlet portion, said trapping means comprising a porous body of graphite made reactive with respect to said impurities by the incorporation therein of materials containing small quantities of substances selected from the group consisting of barium, strontium and nickel.

4. A graphite nuclear fuel bearing component as claimed in claim 3 in which the porous body of graphite is in the form of loose grains retained by a porous container.

5. A graphite nuclear fuel bearing component as claimed in claim 3 in which the porous reactive body includes gettering metal in admixture with graphite activated by a substance selected from the group consisting of barium, strontium and nickel.

References Cited by the Examiner

UNITED STATES PATENTS

| 3,010,889 | 11/1961 | Fortescue et al. | 204—154.2 |
| 3,141,829 | 7/1964 | Fortescue et al. | 176—37 |

FOREIGN PATENTS 850,015  9/1960  Great Britain.

OTHER REFERENCES

Nuclear Science Abstracts, vol. 13, p. 1215, Abstract No. 9001, June 1959.

L. DEWAYNE RUTLEDGE, *Primary Examiner.*

REUBEN EPSTEIN, CARL D. QUARFORTH, *Examiners.*

R. W. MACDONALD, J. V. MAY, *Assistant Examiners.*